United States Patent
Hu et al.

(10) Patent No.: US 6,373,985 B1
(45) Date of Patent: Apr. 16, 2002

(54) E-MAIL SIGNATURE BLOCK ANALYSIS

(75) Inventors: Jianying Hu, Westfield; Richard W. Sproat, Berkeley Heights, both of NJ (US); Hao Chen, Dorval (CA)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/132,682

(22) Filed: Aug. 12, 1998

(51) Int. Cl.[7] .................................................. G06K 9/72
(52) U.S. Cl. .......................................... 382/229; 704/9
(58) Field of Search ................................ 382/229, 230, 382/231, 232, 226, 227; 704/9, 258, 259, 260, 269

(56) References Cited

U.S. PATENT DOCUMENTS

| | | | | |
|---|---|---|---|---|
| 4,423,287 A | * | 12/1983 | Zeidler | 178/22.08 |
| 5,418,717 A | * | 5/1995 | Su et al. | 364/419.08 |
| 5,806,032 A | * | 9/1998 | Sproat | 704/255 |
| 6,021,202 A | * | 2/2000 | Anderson et al. | 380/25 |

OTHER PUBLICATIONS

Atsuhiro Takasu et al., "A Document Understanding Method for Database Construction of an Electronic Library," 1994 IEEE, pp. 463–466.

Andreas Dengel et al., "High Level Document Analysis Guide By Geometric Aspects," International Journal of Pattern Recognition and Artifical Intelligence, vol. 2, No. 4, 1998, pp. 641–655.

* cited by examiner

Primary Examiner—Andrew W. Johns
Assistant Examiner—Seyed Azarian

(57) ABSTRACT

A technique analyzing loosely constrained text blocks, such as e-mail signature blocks by performing a two-dimensional geometrical analysis and a one-dimensional language analysis in order to classify sub-blocks at the loosely constrained text block into particular functional classes. The present technique may also be utilized to identify a personal name from a user name in a loosely constrained text block, such as an e-mail signature block.

42 Claims, 12 Drawing Sheets

E-MAIL SIGNATURE BLOCK ANALYSIS

BACKGROUND OF THE INVENTION

1. Field of the Invention

The present invention relates to the analysis of signature blocks, and more particularly, to the analysis of signature blocks of e-mail messages, combining geometrical layout features and language constraints using finite state transducers.

2. Description of the Related Art

The rapidly increasing usage of the Internet in recent years has made electronic mail (e-mail) one of the most common forms of business and personal communication. How to manage the large and dynamic collection of e-mail documents for efficient storage and information retrieval, and how to convert between e-mail and other forms of messages (e.g., voice mail and fax) to allow convenient access when and where the user needs, are two of the most important research areas in multimedia messaging.

The content of modern-day e-mail has expanded beyond text to include encoded documents, images, even audio and video clips. However, unmarked text is still the prevailing format for e-mail communications due to its simplicity, and sufficiency in terms of conveying ideas, conducting discussions, making announcements, etc. One of the most common structured elements in text e-mail is the signature block. The signature block contains information about the sender, such as e-mail address, web address, phone/fax number, personal name, postal address, etc., and is usually separated from the rest of the message by some sort of border. Accurate identification and parsing of signature blocks is important for many multimedia messaging applications such as e-mail text-to-speech rendering, automatic construction of personal address databases, and interactive message retrieval.

Automatic conversion of e-mail into speech is one of the most important commercial applications of text-to-speech technology, and is one technological component of the growing interest in media conversion.

However, parsing of signature blocks is a very challenging task due to the fact that signature blocks often appear in complex two-dimensional layouts which are guided only by loose conventions. Table 1 shows one example of such a layout.

TABLE 1

An exemplary signature block

| | |
|---|---|
| _/\|\| Vinod Anupam | email: anupam@research.bell-labs.com |
| '0.o' Bell Labs, Lucent Tech. | WWW: |
| | http://www.tempo.lucent.com/"anupam |
| = (_) = 700 Mountain Ave., Rm 2C-236A | phone: (908) 582-7366 |
| U   Murray Hill, NJ 07974-0636 | fax: (908) 582-5809 |

A straightforward line-by-line analysis using conventional text analysis methods is unable to extract fields such as the postal address. Traditional text analysis methods designed to deal with sequential text cannot handle two-dimensional structures, while the highly unconstrained nature of signature blocks makes the application of two-dimensional grammars very difficult.

In particular, conventional techniques in the document analysis field, such as those described in "A document understanding method for database construction of an electronic library," A. Takasu et al., In Proc. 12$^{th}$ CVPR, pp. 263–466, 1994 and "A matrix grammar for document processing," A. Takasu et al., In Proc. 6$^{th}$ Int. Conf. on Industrial & Engineering Applications of Artificial Intelligence & Expert Systems, pp. 197–200, 1993 have applied the use of two-dimensional grammars or array grammars for logical layout analysis in printed documents. Other conventional techniques, such as those described in "High level document analysis guided by geometric aspects," A. Dengel et al., International Journal of Pattern Recognition and Artificial Intelligence, 2(4):641–655, 1988 have applied geometric trees. However, these methods are applicable only to known document types with rigid layout rules, which is not the case with signature blocks where the layout design is highly individualized and unconstrained.

Further, as illustrated in Table 1, the signature block includes several fields, one of which is the e-mail address. If the personal name is not specifically identified, which it almost always is not, it is very difficult to distinguish the personal name from other elements such as street or city names, organization names, etc. As a result, it is difficult to automatically determine the originator of the e-mail message.

SUMMARY OF THE INVENTION

The present invention solves the above-identified problems with analysis of highly unconstrainted text blocks, such as e-mail signature blocks by combining two-dimensional structural (layout) analysis with one-dimensional grammatical (language) constraints. The information obtained from both the layout and language analysis are integrated in the form of weighted finite state transducers (WFST) and the final solution is the optimal interpretation under both analyses.

The present invention also solves the above-identified problems in identifying a personal name from an e-mail signature block, by analyzing the e-mail user name. In particular, for each candidate personal name, the present invention constructs a finite state transducer (FST) which summarizes all e-mail user names that can be derived from the personal name following common conventions. A confidence score is then assigned to the candidate based on whether the corresponding FST contains the actual e-mail user name and through which particular path.

DETAILED DESCRIPTION OF THE INVENTION

Figure 1:
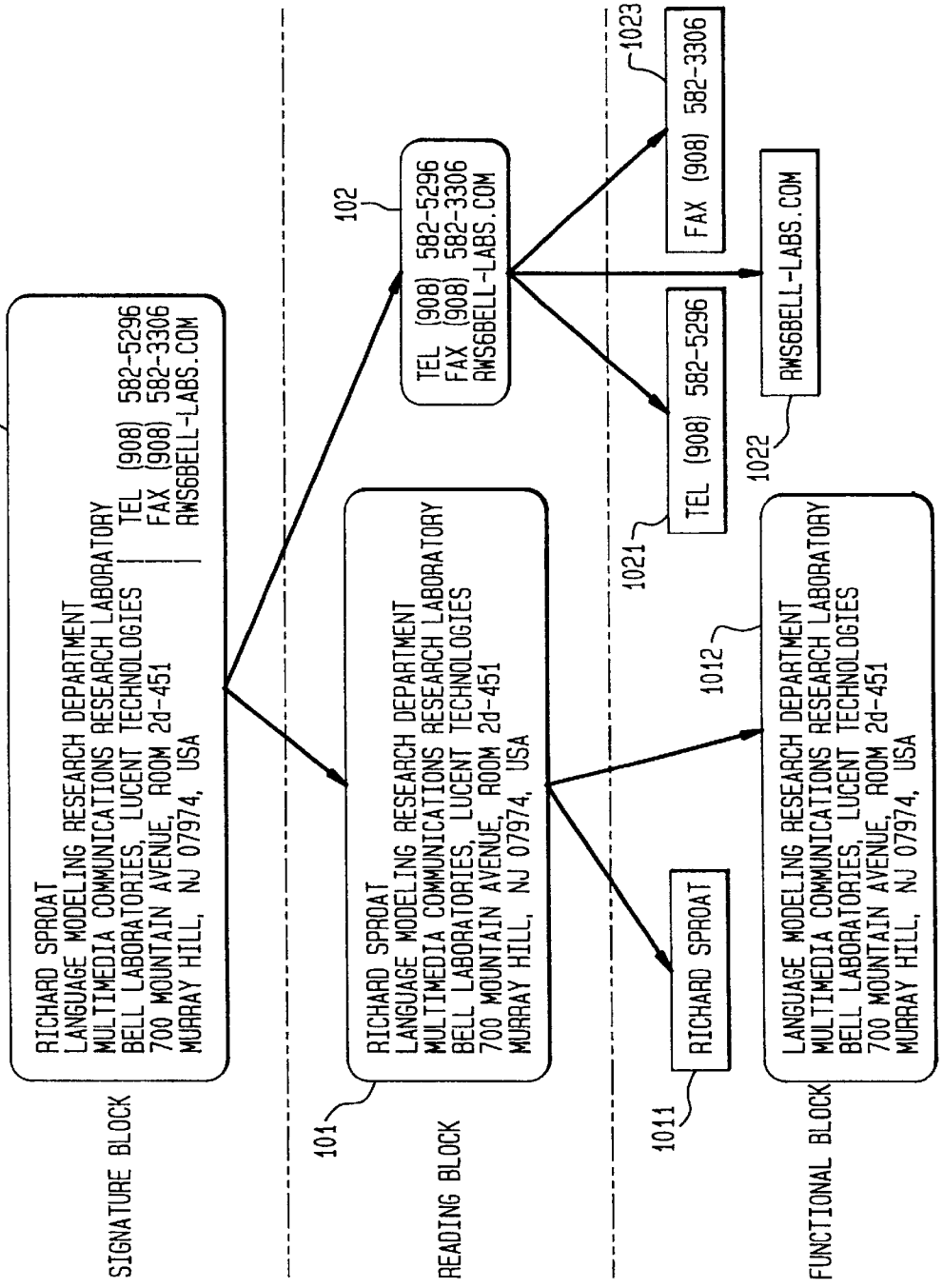
FIG. 1 illustrates a hierarchical text structure in one embodiment of the present invention.

An e-mail signature block usually appears at the end of a message, although it may also be in the middle of a message if there is a postscript or quoted message. As illustrated in Tables 2–5, signature blocks have unlimited formats and are used to indicate contact information, such as e-mail address, web address, phone and fax numbers, name, postal address, and even some quotes and other miscellaneous text.

TABLE 2

One column layout of a signature block

| | |
|---|---|
| $ Andy Elms--Tel: +44 1483 300800 x2753--Fax: +44 1483 34139 | /$ |
| $$ Dept. of Elec. Eng., University of Surrey, GUILDFORD, GU2 5XH, UK. | /$$ |
| $$$ A.Elms@ee.surrey.ac.uk--http://www.ee.surrey.ac.uk/Personal/A.Elms | /$$$ |

TABLE 3

Two-column layout of a signature block

| | |
|---|---|
| Bob Carpenter | Email: carp@research.bell-labs.com |
| Lucent Technologies Bell Labs | WWW: http://macduff.andrew.cmu.edu/carpenter |
| 600 Mountain Avenue, 2D-329 | Voice: 908 582-5790 |
| Murray Hill, NJ 07974 | Fax: 908 582-3306 |

TABLE 4

Variable number of columns layout of a signature block

| | |
|---|---|
| mailto:lyon@research.apple.com | |
| Dick Lyon | Distinguished Scientist |
| Apple Computer 301-DM | Apple Research Labs |
| One Infinite Loop | phone: (408) 974-4245 |
| Cupertino CA 95014 | fax: (408) 974-8414 |
| http://www.research.apple.com/personal/lyon/ | |

TABLE 5

Non-rectangular columns in a signature block

| | |
|---|---|
| Stefan Reichling | Anorganisch-Chemisches Institute |
| Tel +49-6221-548649 | Universitaet Heidelberg |
| Fax +49-6221-545707 | 69120 Heidelberg |
| e-mail: steve@indi.aci.uni-heidelberg.de | Germany |
| www: http://www.rzuser.uni-heidelberg.de/~il1 | |

Unlike other parts of the e-mail message, the signature block is highly unconstrained in that it is quite personalized and there are almost no style restrictions. As a result, analysis of an e-mail signature block presents both geometrical and linguistic problems.

Geometrical properties indicate the reading sequence in a signature block. The simplest layout of a signature block has only one column and is read from top to bottom, and left to right on each line (Table 2). However, for esthetic reasons, and to shrink the length, signature blocks often have rather complicated layouts. Table 3 shows a two-column layout where the first column must be read before the second column. Table 4 shows another example where the number of columns varies from top to the bottom. There is only one column at the top line and the bottom line, however, two columns are juxtaposed in the middle. In Table 5, the columns are not rectangularly shaped. The unconstrained nature of signature block formats significantly complicates the analysis task.

Regarding language complexity, some components of the signature block, such as e-mail and web addresses, have strict patterns and are easily recognizable. Others, such as personal names and postal addresses, have few lexical constraints. Worse yet, there are occasionally quotes or other miscellaneous text in the signature blocks, which have no lexical constraints at all. Humans identify these components by the semantics of natural language. However, natural language understanding by computer is, as yet, an unsolved problem.

Before continuing, several terms used throughout this application must be defined. A signature block, as shown in Tables 1–5, is part of an e-mail message. The signature block is comprised of several continuous lines of text which are used primarily to indicate personal contact information. A signature block may be decomposed into reading blocks. Reading blocks ensure the coherence of text. Text in a reading block can be read out in a meaningful order by simply following the sequence from top to bottom, and from left to right on each line. Text in one reading block is normally read out completely before proceeding to another reading block. Interleaving reading between reading blocks is deprecated. A reading block is decomposed further into functional blocks. Text in each functional block belongs to the same functional class. Ten functional classes are defined in one embodiment of the present invention:

(1) e-mail address,
(2) web address,
(3) phone number,
(4) fax number,
(5) personal name,
(6) postal address,
(7) title,
(8) quote,
(9) stub (auxiliary words, such as "home" or "office" before or after a phone number), and
(10) miscellaneous text. Any text that is not related to any of the first nine functional classes is miscellaneous text. Signature blocks, reading blocks, and functional blocks constitute a hierarchical text structure.

As illustrated in FIG. 1, the signature block 10 is decomposed into reading block 101, which includes the personal name and postal address and reading block 102, which includes the phone number, fax number, and e-mail address. Reading block 101 is further decomposed into functional block 1011, which includes the personal name and functional block 1012 which includes the postal address. Similarly, reading block 102 is decomposed into functional block 1021, which includes the phone number, functional block 1022, which includes the e-mail address, and functional block 1023, which includes the fax number.

Figure 2:
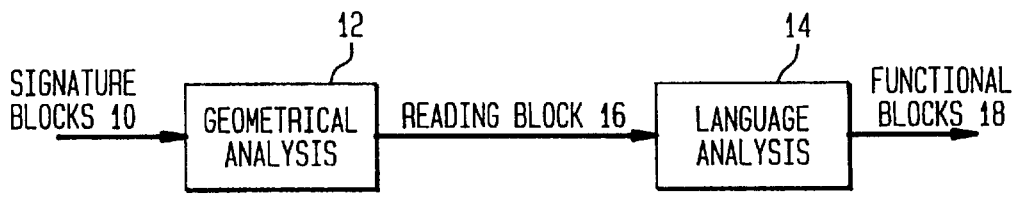
FIG. 2 illustrates a flowchart of the signature block analysis in one embodiment of the present invention.

A flowchart of the signature block analysis of the present invention in one embodiment, is shown in FIG. 2. The input is a signature block 10 extracted from a message with TAB keys expanded. Then, geometrical analysis 12 and language analysis 14 are performed to break signature block 10 down into several reading blocks 16 and then several functional blocks 18, each related to one of the ten functional classes described above.

The two major steps of the present invention are the geometrical analysis 12 and language analysis 14.

The geometrical analysis 12 breaks a signature block down to several reading blocks. By doing this, the geometric analysis 12 ensures the coherence of text inside a reading block. Text in a reading block can be read out simply from top to bottom, and left to right on each line. The geometrical analysis 12 shrinks the dimensionality of the analysis problem by converting the two-dimensional signature block into a one-dimensional reading block which makes the following language analysis 14 possible.

The language analysis 14 breaks a reading block into several functional blocks and determines each functional blocks' functional classes. This is done by applying a Weighted Finite State Transducer (WFST) with lexical and grammatical constraints.

1. Geometrical Analysis 12

The geometrical analysis 12 breaks a signature block 10 down to one or more reading blocks 16, where text in each reading block 16 can be read out continuously.

Figure 3:
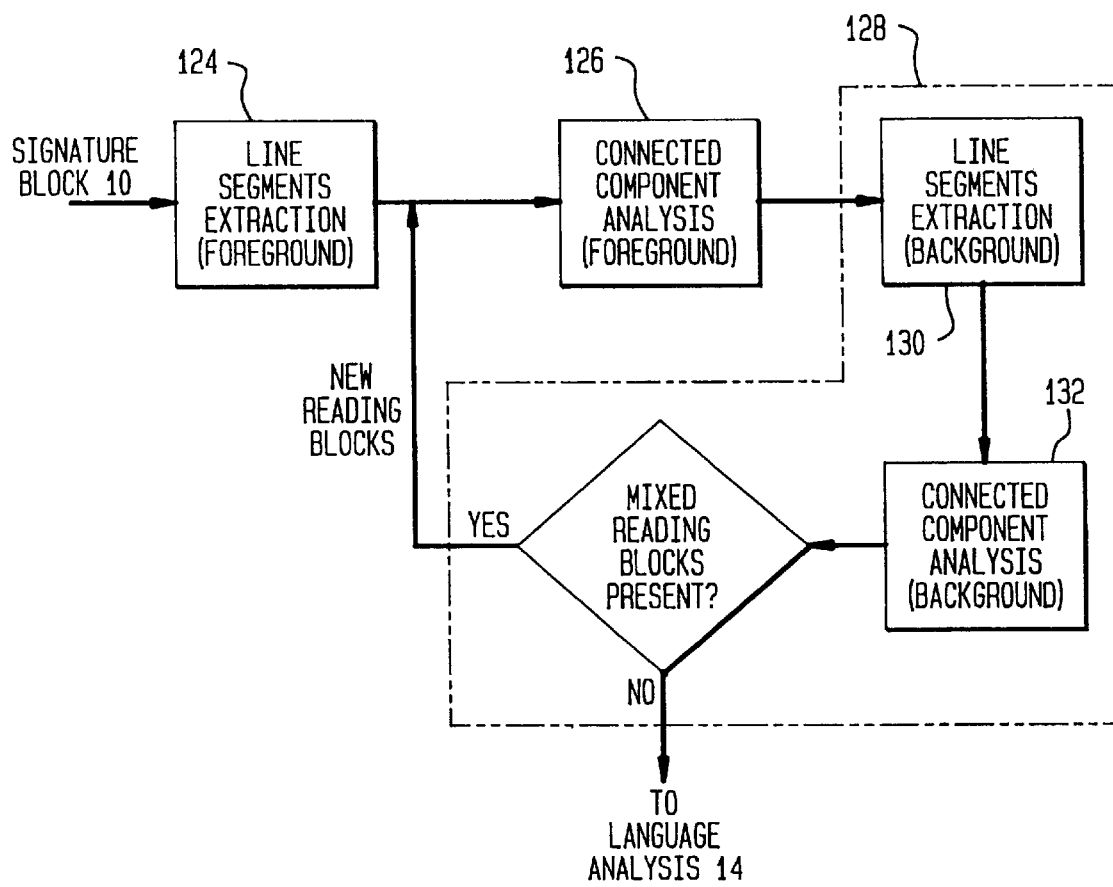
FIG. 3 illustrates the geometrical analysis in one embodiment of the present invention.

The geometrical analysis 12 is illustrated in more detail in FIG. 3. A geometrical analysis 12 includes a foreground line segment extraction 124, a foreground connected component analysis 126, and an optional mixed reading block analysis 128, which are described in more detail below.

1.1 Line Segment Extraction 124

The line segment extraction 124 breaks down a line of text into several line segments where characters in the same line segment should belong to the same reading block, but different line segments may or may not be in the same reading block. Obviously, characters that are close to each other (such as the characters in the first line in the same column of Table 4) should be contained in the same line segment, whereas visually separated characters (such as characters in the first line in different columns of Table 4) should be divided into different line segments. The following rules are used in the line segment extraction 124:

- two adjacent alphanumerics (A–Z, a–z, and 0–9) should be in the same line segment, and
- for each pair of alphanumerics that are separated only by non-alphanumerics, the disconnectedness score of each of the intervening non-alphanumerics is summed. If the sum is greater than a threshold, the two alphanumerics should be separated into different line segments. Otherwise, they should be contained in the same line segment.

The disconnectedness score is assigned to each non-alphanumeric to quantitatively segment characters. Some characters are used to indicate a visual segmentation point, such as "|" and ",", and they are assigned high positive values as their disconnectedness score. Some characters, such as ":" and "–", visually indicate a connection and they are assigned high negative values. Therefore, a highly positive sum of disconnectedness scores indicates a likely segmentation point, whereas a highly negative sum indicates a likely connection point.

However, certain segmentation ambiguities cannot be resolved completely using geometrical information alone. These are further analyzed with language information, taken into account in the language analysis 14 discussed below.

1.2 Foreground Connected Component Analysis 126

The line segment extraction 124 horizontally connects closely related individual characters into line segments. The next step is to extract vertically connected line segments, using the foreground connected component analysis 126.

Text in a reading block 16 is usually grouped together, which is easily identified, using a conventional connected component analysis technique. However, there are cases where different reading blocks are connected (as shown in Table 4) and the conventional connected component analysis technique will not suffice.

There are several algorithms for the connected component analysis. In a preferred embodiment, the Line Adjacency Graph (LAG) algorithm is disclosed in "Algorithms for Graphics and Image Processing," T. Pavlidis, Computer Science Press, 1982, is utilized.

The LAG algorithm is a bottom-up approach, where each line in the text is broken into several line segments. Overlapping line segments on adjacent lines are placed into the same connected component and all line segments in a connected component are found from the transitive closure.

In the conventional LAG algorithm, two line segments on adjacent lines are considered vertically connected if they overlap, i.e. they have at least one x-coordinate in common. However, this simple rule causes some problems in signature block analysis. In Table 4, although the line segment on the first line overlaps with each of the line segments on the second line, they actually belong to different reading blocks. For human vision, two vertically adjacent line segments must overlap considerably to have the effect of being visually connected, which is reflected in the definition of vertical connectedness.

Two line segments $L_1((x_A, y))$ and $L_2((x_C, y+1), (x_D, y+1))$ are considered vertically connected if and only if 1. $x_A < x_D$ and $x_B > x_C$ (i.e. $L_1$ and $L_2$ overlap), and
2.

$$\frac{\min(x_B - x_C, x_D - x_A)}{\min(x_B - x_A, x_D - x_A)} > \text{threshold}$$

The transitive closure of all pairs of vertically connected line segments defines a connected component. There are many existing algorithms to compute transitive closure efficiently. In one embodiment, the present invention implements the algorithm disclosed in "Fundamentals of Data Structures in C.," E. Horowitz et al., Computer Science Press, 1993 for computing equivalence classes. The algorithm has a time complexity of O(M+N), where M is the number of line segments and N is the number of pairs of vertically connected line segments.

1.3 Mixed Reading Block Analysis 128

Usually a connected component contains only one reading block. However, there are a few cases where there is more than one reading block in a connected component. Table 6 is a typical example where several reading blocks are juxtaposed in the middle and the reading block at the top or bottom connects them together. The top or bottom reading block is so long that the principle of vertical connectedness does not help to break them from the left or right reading blocks.

TABLE 6

Mixed reading blocks

"A friend in need is a friend in deed."
| Nematollaah Shiri | Office: LB 1041-1 |
| Concordia University | Tel: (514) 848-3033 |
| 1455 de Maisonneuve West | Fax: (514) 848-2830 |

TABLE 6-continued

Mixed reading blocks

Montreal, Quebec, H3G 1M8  shiri@cs.concordia.ca
URL http://www.cs.concordia.ca/~grad/shiri/

To detect the mixed reading block, line segment extraction 130 and connected component analysis 132 are performed on all background characters. Background characters are space characters and a background connected component is comprised of connected space characters. A background connected component is a separator if (1) at least one line segment of the background connected component is in the middle of the reading block, in other words, it does not touch the left or right margin of the reading block; and (2) the total height of the background connected component is greater than a threshold. Table 7 shows a case where the background connected component is a separator. (The background connected component is filled with "#")

TABLE 7

Background connected component which is a separator

"A Friend in need is a friend in deed."
Nematollaah Shiri############Office: LB 1041-1
Concordia University#########Tel: (514) 848-3033
1455 de Maisonneuve West#####Fax: (514) 848-2830
Montreal, Quebec, H3G 1M8####shiri@cs.concordia.ca
URL http: //www.cs.concordia.ca/~grad/shiri/

Figure 4:
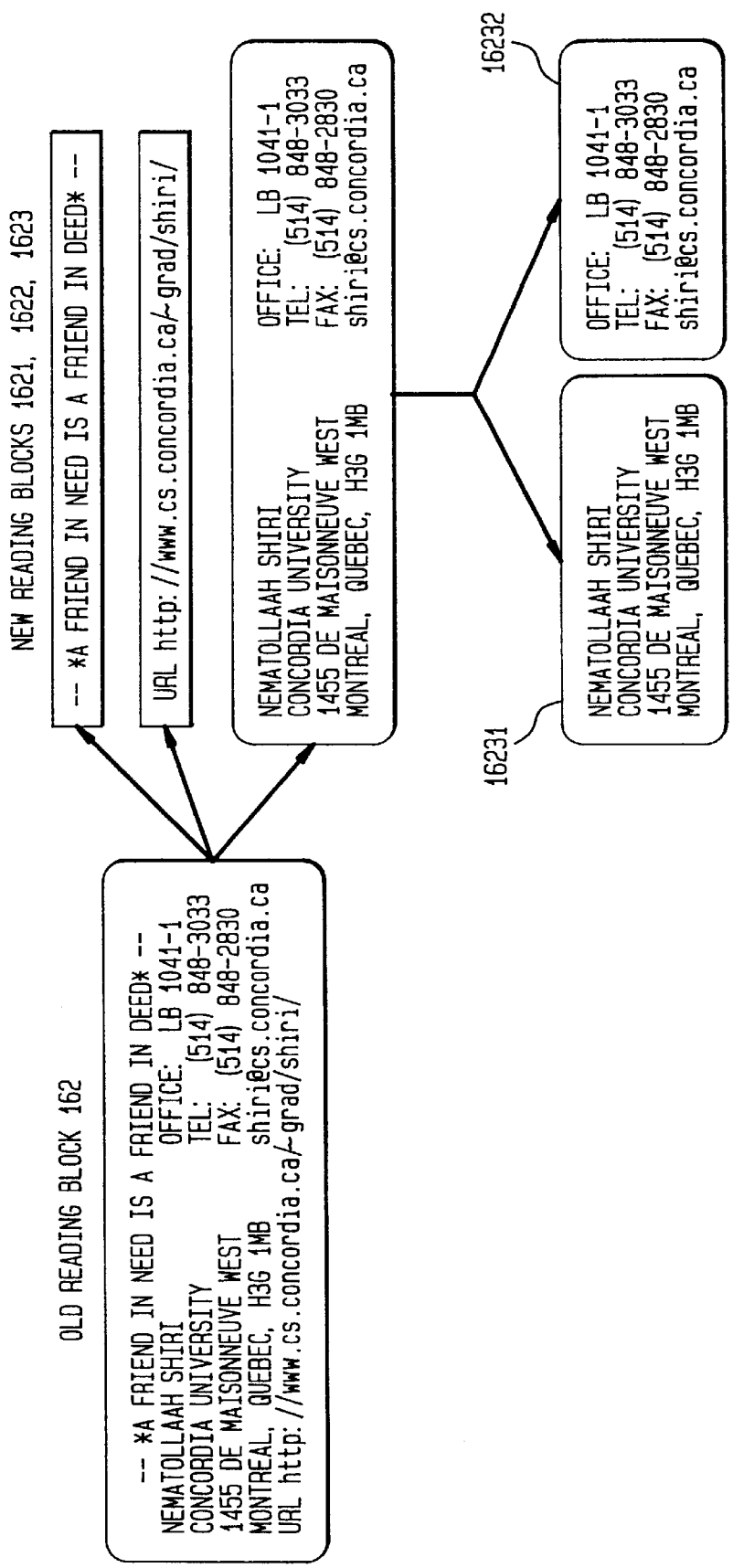
FIG. 4 illustrates the decomposition of a mixed reading block into reading blocks.

If a separator is found, the corresponding reading block is broken into three new blocks. The first new reading block contains line segments which are above the separator. The second new reading block contains line segments which are below the separator. The third one contains the remaining line segments from the old reading block. In fact, the first and second new reading blocks are the top and bottom block in the old reading block, respectively, and the third reading block contains all the juxtaposed blocks in the middle of the old reading block. After that, each new reading block undergoes connected component analysis 126 again. FIG. 4 illustrates the decomposition of such a reading block 162. The old reading block 162 from Table 7 is divided into new reading blocks 1621, 1622, and 1623 utilizing mixed reading block analysis 128. The third reading blocks 1623 is then further decomposed into reading blocks 16231 and 16232, utilizing the foreground connected component analysis 126. The reading blocks 1621, 1622, 16231, and 16232 are then input to language analysis 14, to produce functional blocks 18.

1.4 Remaining Errors

Few geometrical analysis algorithms perform at 100% accuracy. Both under-segmentation and over-segmentation errors may result from the geometrical analysis 12. In fact, most of them are not remediable unless lexical knowledge is applied. While the next stage, language analysis 14, serves to detect functional classes, the language analysis 14 also corrects the remaining segmentation errors by combining the geometrical analysis 12 with language constraints.

2. Language Analysis 14

Figure 5:
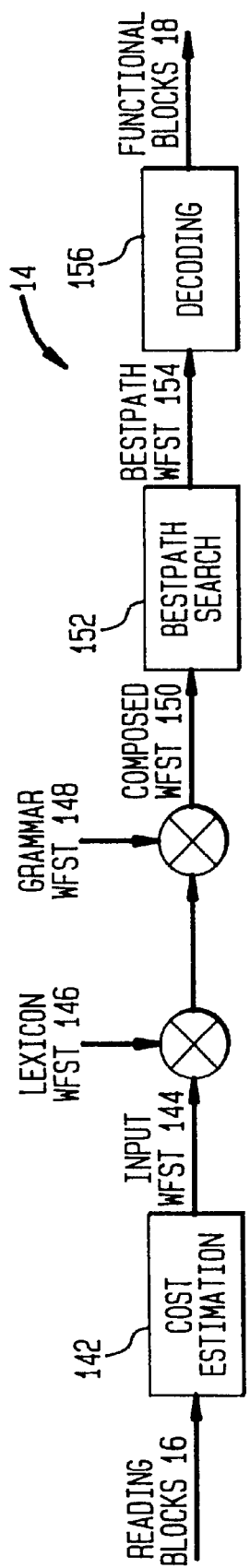
FIG. 5 illustrates the language analysis in one embodiment of the present invention.

The language analysis 14 breaks a reading block 16 into several functional blocks 18 and relates each functional block 18 with a functional class. The language analysis 14 is carried out using weighted finite state transducers (WFST) as shown in FIG. 5. First, cost estimation 142 is performed in order to obtain the cost of relating a line segment with each functional class. Then, an input WFST 144 is built, which incorporates all possible choices with their costs. The input WFST 144 is composed with a lexicon 146 and grammar 148 WFST and the functional class of each line segment is revealed from the optimal path in the composed WFST 150. The composed WFST 150 is input to a bestpath search 152 which produces a bestpath WFST 154. The bestpath WFST 154 then undergoes decoding 156, to produce the functional blocks 18.

Figure 6:
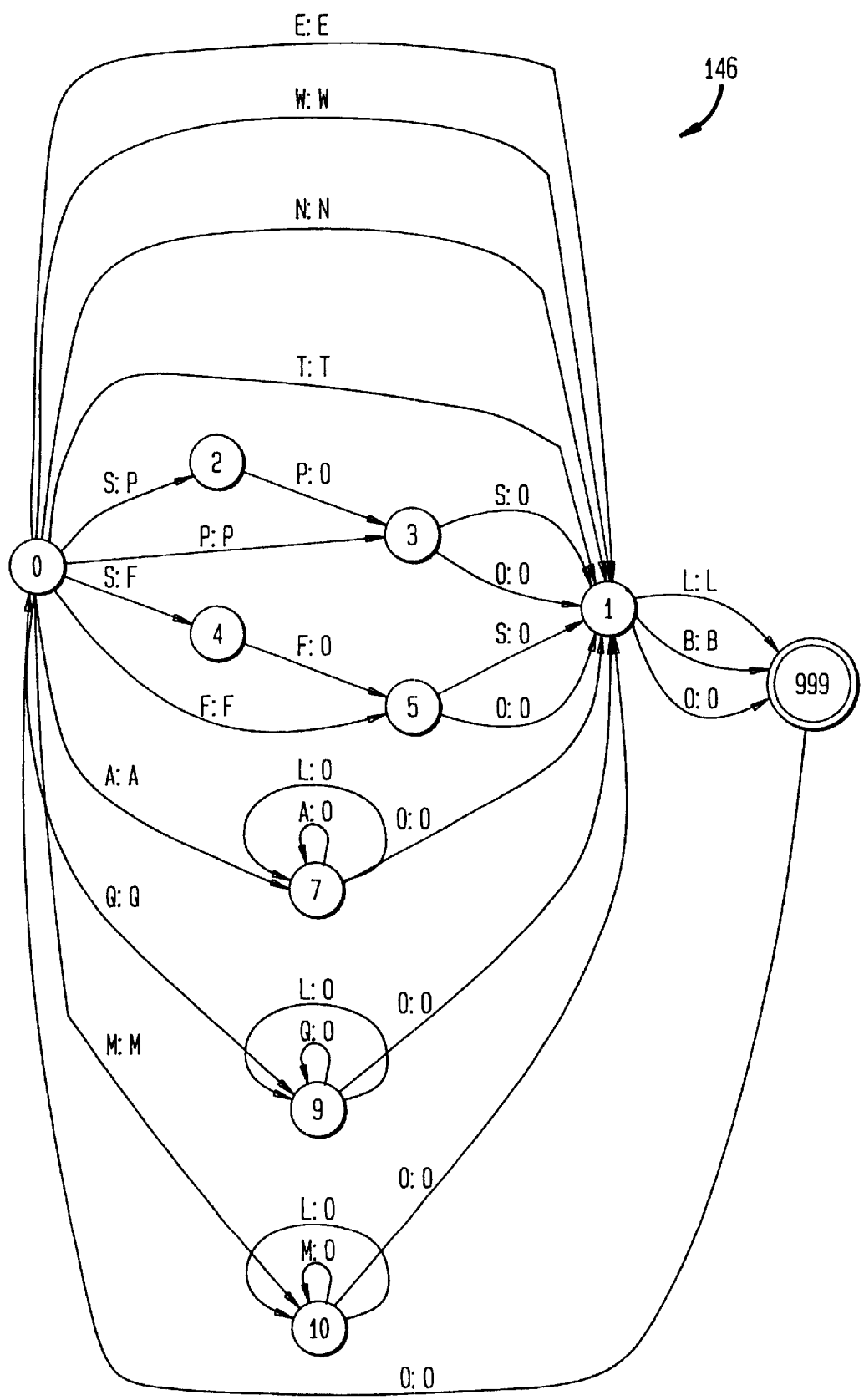
FIG. 6 illustrates an exemplary lexicon weighted finite state transducer (WFST)
Figure 7:
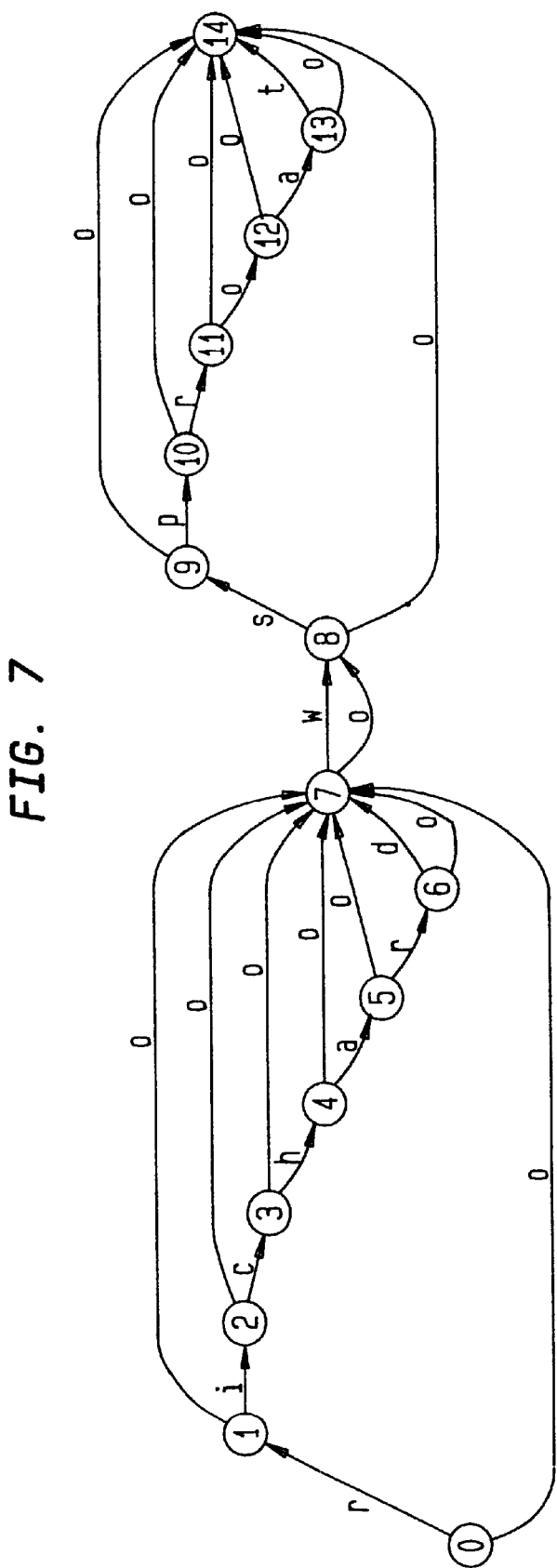
FIGS. 7 and 8 illustrate an exemplary finite state acceptor (FSA)

A weighted finite state transducer (WFST) contains a set of states with a distinguished start state and one or more final states. Each state except the final state has a number of arcs to other states. Each arc has an input symbol, an output symbol, and a cost. FIG. 6 illustrates an exemplary lexicon WFST 146. A Finite State Acceptor (FSA) is a particular type of WFST, where the input symbol is identical to the output symbol on each arc, and where the cost on each arc is the free cost (usually 0), as shown in FIG. 7.

Following any path leading from the start state to the final state in a WFST, there is an input string (string of input symbols), an output string (string of output symbols), and a total cost (the sum of all costs on the path). The WFST is said to transduce the input string into the output string with the total cost.

The composition of two WFSTs is a new WFST such that if the first WFST transduces string s1 into s2 with cost c1 and the second WFST transduces string s2 into s3 with cost c2, the new WFST transduces s1 into s3 with cost c1+c2.

The bestpath search 152 searches a WFST for the optimal path leading from the start state to the final state in the sense that it has the minimum total cost. The bestpath is represented as a single path WFST, identified in FIG. 5 as bestpath WFST 154.

Conventional weighted finite state transducers and their properties and operations are generally described in U.S. Pat. No. 5,781,884.

WFSTs have been widely used in natural language processing. More recently, they have also shown to be powerful techniques for speech and handwriting recognition, where the recognition process is viewed as a cascade of weighted finite state transductions from the input signal sequence to a word or sentence in a given language. In the present invention, the process of language analysis is formalized as a cascade of transductions from line segments to functional blocks.

2.1 Cost Estimation 142

For each line segment in the reading block 16, there are a pair of neighboring nodes in the input WFST 144 connected by several arcs. On each arc, the input/output symbol represents a functional class and the cost reflects how likely the line segment is related to that functional class. In the present embodiment, ten functional classes are defined as shown in Table 8. In addition, two more symbols are used to represent the line break (L) and boundary between reading blocks (B)

TABLE 8

Functional Classes

| Symbol | Functional Class | Example |
|---|---|---|
| E | E-mail address | rvs@research.bell-labs.com |
| W | Web address | http://www.bell-labs.com/who/rvs |
| P | Phone number | (908)582-6456 |
| F | Fax number | (908)582-7308 |
| N | Personal name | Richard W. Sproat |

TABLE 8-continued

Functional Classes

| Symbol | Functional Class | Example |
| --- | --- | --- |
| A | Postal address | 700 Mountain Avenue, Murray Hill, NJ 07974-0646 |
| T | Title | Associate Professor |
| Q | Quote | "640K ought to be enough for everyone" - Bill Gates, 1980 |
| S | Stub | home (following a phone number) |
| M | Miscellaneous text | Address valid until Aug. 29, 1997 |

Text relating to the first four functional classes (e-mail address, web address, phone and fax numbers) has a relatively strict pattern. These classes are termed strict classes. The remaining six classes (personal name, postal address, quote, stub, and miscellaneous text) are termed loose classes since they have rather free styles. Cost estimation is quite different between strict classes and loose classes.

2.1.1. Cost Estimation for Strict Classes

Text belonging to strict classes is identified by regular expression matching. There are a number of ways to do regular expression matching in the C/C++ language. One may call the regex(3) library, but it is fairly primitive. Perl is very powerful in regular expression matching, but calling Perl from a C/C++ program is considerably more expensive. The preferred embodiment of the present invention uses a conventional finite state linguistic analysis package, such as the Lextools package which allows the specification of the cost for each symbol, and which enables the fine tuning of the "greediness" of the regular expression.

Different writing styles of e-mail address, web address, phone and fax numbers must be accounted for. Once the entire text in a line segment matches the regular expression, it is assigned a very low cost relating to the corresponding functional class and relatively high costs relating to all other classes.

Many under-segmentation errors resulting from geometrical analysis 12 for line segment extraction can be detected during the cost estimation of strict classes. Table 9 shows a typical under-segmentation error where the personal name is placed in the same line segment as the phone number because they are so close to each other.

TABLE 9

Under-segmentation error

Tel: 908 582 1211 E-mail: Koen@research.bell-labs.com

This kind of error cannot be detected by the geometrical analysis 12 alone. To detect this error, after successfully matching the entire text against the regular expression for phone number, the matched phone number as well as keywords indicating a phone number (such as tel, phone, voice) are removed from the original text. The remaining text is checked for any alphanumerics. If any are found, this indicates that the line segment contains other text, because of an under-segmentation error. Then, re-segmentation is performed on the line segment by breaking the first segment at each word boundary. This would seem to lead to over-segmentation very easily, but that problem will be taken care of by the language directed segmentation algorithm to be discussed below.

2.1.2. Cost Estimation for Loose Classes

Since there are no strict patterns for text relating to loose classes, loose class text is mostly identified by some commonly observed conventions. For example, the first letter of each word is usually capitalized in names and addresses, but not in quotes or miscellaneous text; quotes are usually contained in quotation marks; digits tend to appear more frequently in addresses than other classes. Contrary to strict classes where the estimated costs are either low (for likely classes) or high (for unlikely classes), the confidence in identifying loose class text is much lower and the estimated costs among different functional classes do not differ as much.

Cost estimation for loose class text, as the name suggests, is not highly reliable due to their vague patterns. This especially causes trouble in distinguishing personal names from city names, since there are very few rules guiding the composition of personal names and in fact many personal names are easily confused with city names. Relying on a dictionary which contains most, if not all, personal names is impractical. As a result, the present invention proposes a personal name identification approach based on e-mail username.

2.1.3. Personal Name Identification

More often than not, the e-mail username is derived from the real personal name. The derivation often observes the following rules:

a username is constructed by concatenating letter strings directly or via any punctuation characters, the letter strings must be prefixes of the first name, middle name, or family name, and each of the first name, middle name, or family name may contribute zero or one prefix as a substring of the username.

Usernames constructed by these rules are termed well-formed usernames. For example, from personal name "Richard W. Sproat", "rws", "rwsproat", "richardsproat", "richs", "sproat" are all well-formed usernames, whereas "s_rws" is not.

It is easy to automatically construct a Finite State Acceptor (FSA) which enumerates all possible well-formed usernames from a given personal name. FIG. 7 shows such an FSA for personal name "Richard W. Sproat". Any usernames that are not in the FSA are not well-formed.

Figure 8:
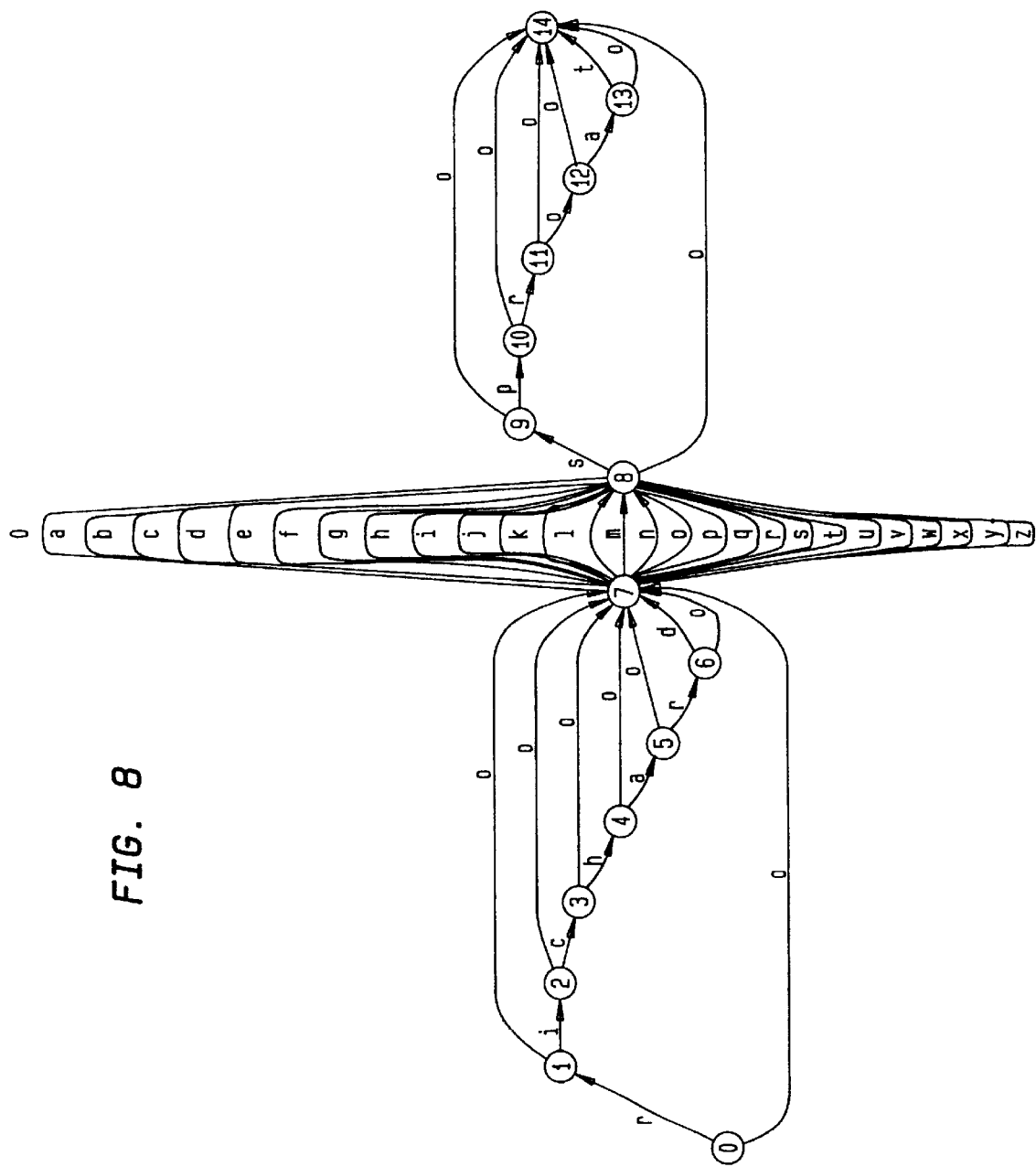

Sometimes, the middle initial appears in the username but is omitted in the written form of the personal name. For example, "Richard W. Sproat" is sometimes abbreviated as "Richard Sproat", but the initial "W" is retained in the username "rws". To cover the scenario where the middle initial is omitted from the personal name, all 26 letters are considered as candidates for the middle initial. FIG. 8 shows the well-formed username FSA from the personal name "Richard Sproat". Note that since the username is case insensitive, all letters in the personal name are changed to lowercase. All punctuation symbols in the username, if any, are removed before the username is matched against the FSA.

This technique is used to estimate if a candidate phrase is a personal name, given a well-formed username. First, a single path FSA which generates the username is constructed. Then, a well-formed username FSA from the candidate phrase (assuming it is a personal name) is generated and composed with the first FSA. If the final FSA is non-empty, it indicates that the phrase is a personal name and thus a low cost is assigned for it to be related to the personal name functional class. By this technique, personal names, which are a loose class, can be identified with relatively high confidence.

2.2 The Input WFST 144

Figure 9:
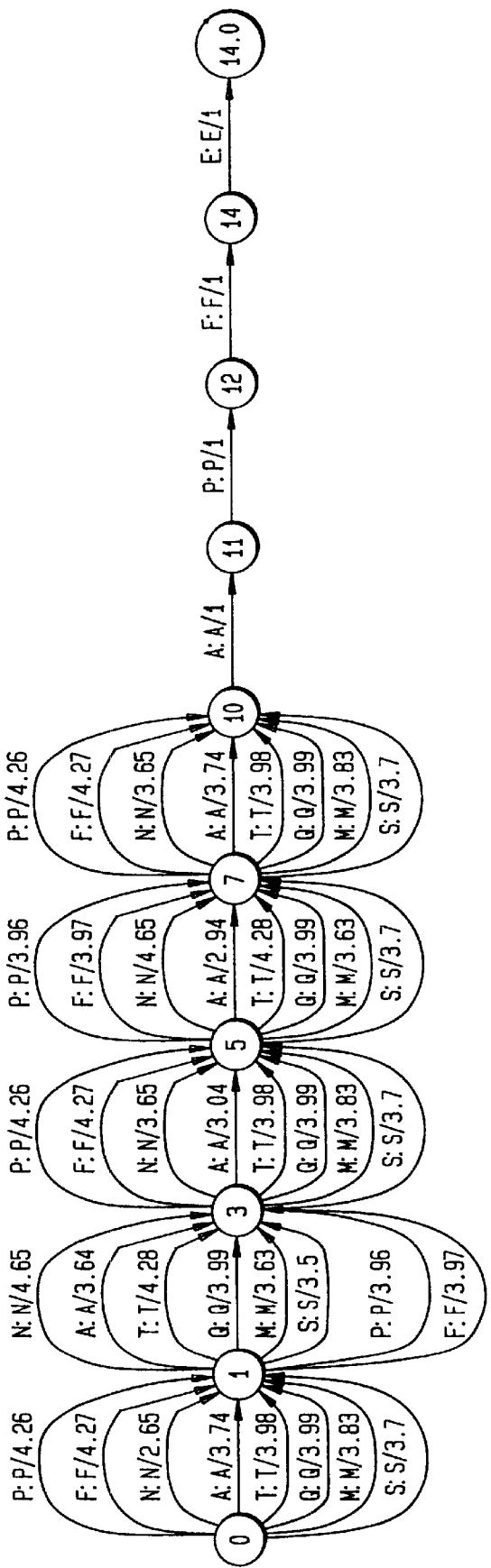
FIG. 9 illustrates an exemplary reading block and its corresponding input weighted finite state transducer (WFST)

An input WFST 144 is built for each reading block 16. For each line segment in the reading block 16, there are a pair of neighboring nodes in the WFST connected by several arcs. The input/output symbol of the arc represents a functional class and the cost indicates the likelihood that the line segment is related to that functional class. FIG. 9 shows a reading block 16 and its input WFST 144. Arcs whose symbols represent line breaks are removed from the input WFST 144 in FIG. 9 for ease of reading. Note that although in this example the input and output symbols on each arc are identical, they could be different due to encoding in the language directed segmentation algorithm which is discussed below. The WFST 144 is called an input WFST since it is the first in a cascade of WFSTs.

2.2.1 Language Directed Segmentation

Over-segmentation errors resulting from the geometric analysis 12 cause serious problems for the cost estimation 142 of line segments. A pattern in an entire line segment may not be carried by its individual words. For example, while "Richard Sproat" is identified as a personal name with regard to the username "rws" by the personal name identification algorithm, neither of the first name or family name alone can be identified in this way.

Since the over-segmentation problem cannot be solved by the geometrical analysis 12 alone, a language directed segmentation approach is proposed. For all of the line segments on the same line in a reading block, all possible segmentation positions are evaluated. In other words, to combine any two or more adjacent line segments on the same line into a new line segment and all the possible combinations are built into the input WFST 144. Therefore, the input WFST 144 contains choices for not only functional class of each line segment but also segmentation positions on each line of the reading block 16. The best choices of both of them are to be determined together after the input WFST 144 is composed with the lexicon 146 and grammar 148 WFSTs.

| "Dr. | Richard | W. | Sproat". |
|---|---|---|---|
| A | B | C | D |

Figure 10:
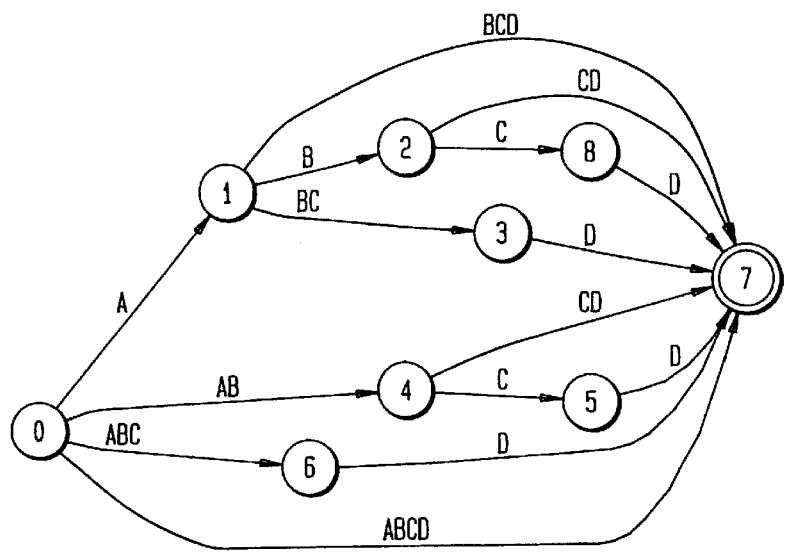
FIG. 10 illustrates an exemplary input WFST including segmentation positions.

Since the words are written very far apart, this line is broken into four line segments A–D during the geometrical analysis 12, where each line segment contains only one word. In order to determine the best segmentation positions, the input WFST 144 in FIG. 10 is built, which enumerates all possible combinations of the four line segments (represented as A, B, C, and D respectively in FIG. 10). Each arc in FIG. 10 represents several actual arcs, where each actual arc is associated with a different functional class and its associated cost.

2.3 Bestpath Search 152

After the input WFST 144 is composed with the lexicon 146 and grammar 148 WFSTs, the bestpath search 152 is performed to find the functional class of each line segment (or combination of line segments). In order to trace back the segmentation positions, i.e. the combination of line segments, the input symbol in the input WFST 144 must be encoded to contain information on both functional class and number of combined line segments, as in the following:

input symbol=index of functional class+(number of combined line segments−1)*number of functional classes The output symbol of the arc need not be encoded, as this is just the index of the functional class.

For example, assume that the indices of functional classes for e-mail address, web address, phone number, fax number, personal name, postal address, title, quote, stub, and miscellaneous text are from 1 to 10 respectively. If an arc represents the combination of 3 line segments related to a personal name, its input symbol is 3*10+5=35 and its output symbol is 5.

After the bestpath search on the composed WFST 150, each input symbol is decoded 156 to recover the functional class and the number of combined line segments by the following:

index of function classes=input symbol MOD number of functional classes+1 number of combined line segments=input symbol DIV number of functional classes.

The cost of combined line segments should be normalized to be comparable with the uncombined ones. In the bestpath search 152, the total cost is defined as the sum of all costs on the path. To be comparable, the cost of combined line segments is multiplied by the number of combinations.

The lexicon WFST 146 describes the construction of a functional block 18 from the line segments as illustrated in FIG. 6. For example, a complete postal address could be composed of one or more lines, where each line could in turn be composed of one or more line segments. However, a personal name is not usually written in more than one line. Such observations are incorporated in the lexicon WFST 144.

Figure 11:
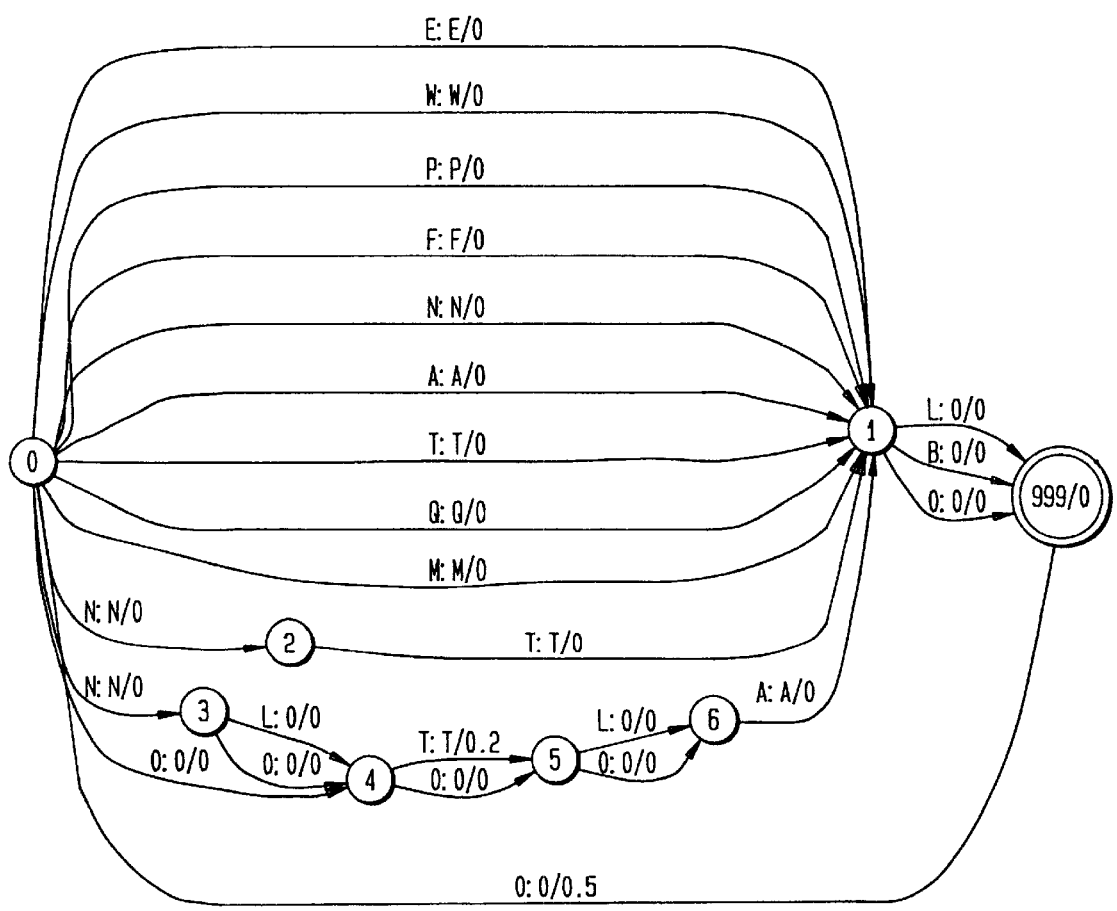
FIG. 11 illustrates an exemplary grammar WFST in one embodiment of the present invention.

The grammar WFST 148 describes the construction of a reading block 11 from functional blocks 18, as shown in FIG. 11. To discourage transitions between different lexical units, a moderate cost is assigned to the backloop transition. The lexicon WFST 146 is separated from the grammar WFST 148 because they represent different levels of abstraction.

To determine the functional class of each line segment as well as the segmentation positions on each line, the input WFST 144 is composed with the lexicon 142 and grammar 148 WFSTs. By examining the optimal path in the compound WFST 150, adjacent line segments relating to the same functional class are grouped into one functional block 18 and therefore a reading block 16 is broken into several functional blocks 18.

3. Signature Block Identification

A simplified version of the geometrical 12 and language 14 analysis can be used for the identification of signature blocks of e-mail messages. In one application (an e-mail text-to-speech rendering system (Emu)), signature blocks are identified from the e-mail message by an N-gram character class model, which is not highly reliable, and a more accurate algorithm is necessary.

Figure 12:
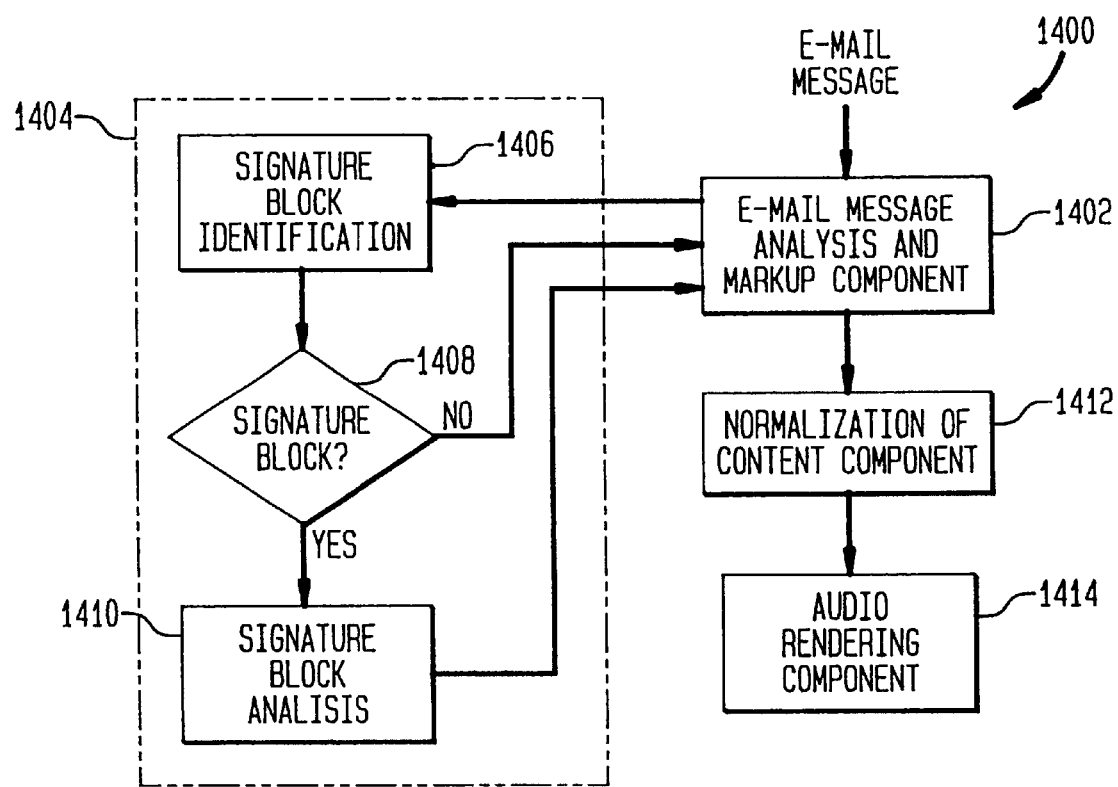
FIG. 12 illustrates an e-mail text-to-speech rendering system in which the signature block identification and analysis apparatus is implemented.

In the Emu system 1400, illustrated in FIG. 12, an e-mail message is first parsed into different regions (headers, quoted material, and signature blocks, among others), and these regions are marked with tags that indicate the regions' properties. The text block near the end of the e-mail message is submitted to the signature block identification and analysis apparatus 1404 for verification by the e-mail message analysis and markup component 1402. If the signature block is not verified, the block is returned to the e-mail message analysis and markup component 1402. If the signature block is verified, the marked up and analyzed signature block is returned to e-mail message analysis and markup component 1402 for incorporation into an e-mail document tree structure. The present invention is used in signature block identification and analysis apparatus 1404, first, to identify signature blocks 1406, and second to parse them into meaningful components 1408, 1410. Then a normalization of the text is computed by content normalization component 1412. The normalization performed largely involves the expansion of unusual "words" (such as WinNT), as well as e-mail addresses, URL's and other non-standard material. The output of the normalization is device independent in the sense that the normalization performed produce text that is appropriate as input to any (English) TTS system. Finally, the marked-up normalized text is rendered into audio by audio rendering component 1414.

In a signature block, an e-mail address, web address, phone and fax numbers, name, postal address, title and stub, are expected more often than miscellaneous text (miscellaneous text is distinguished by high percentage of words that do not begin with uppercase letters); while in a non-signature block, the opposite is usually true. Quotes are assumed to appear equally frequently between signature blocks and non-signature blocks.

Figure 13:
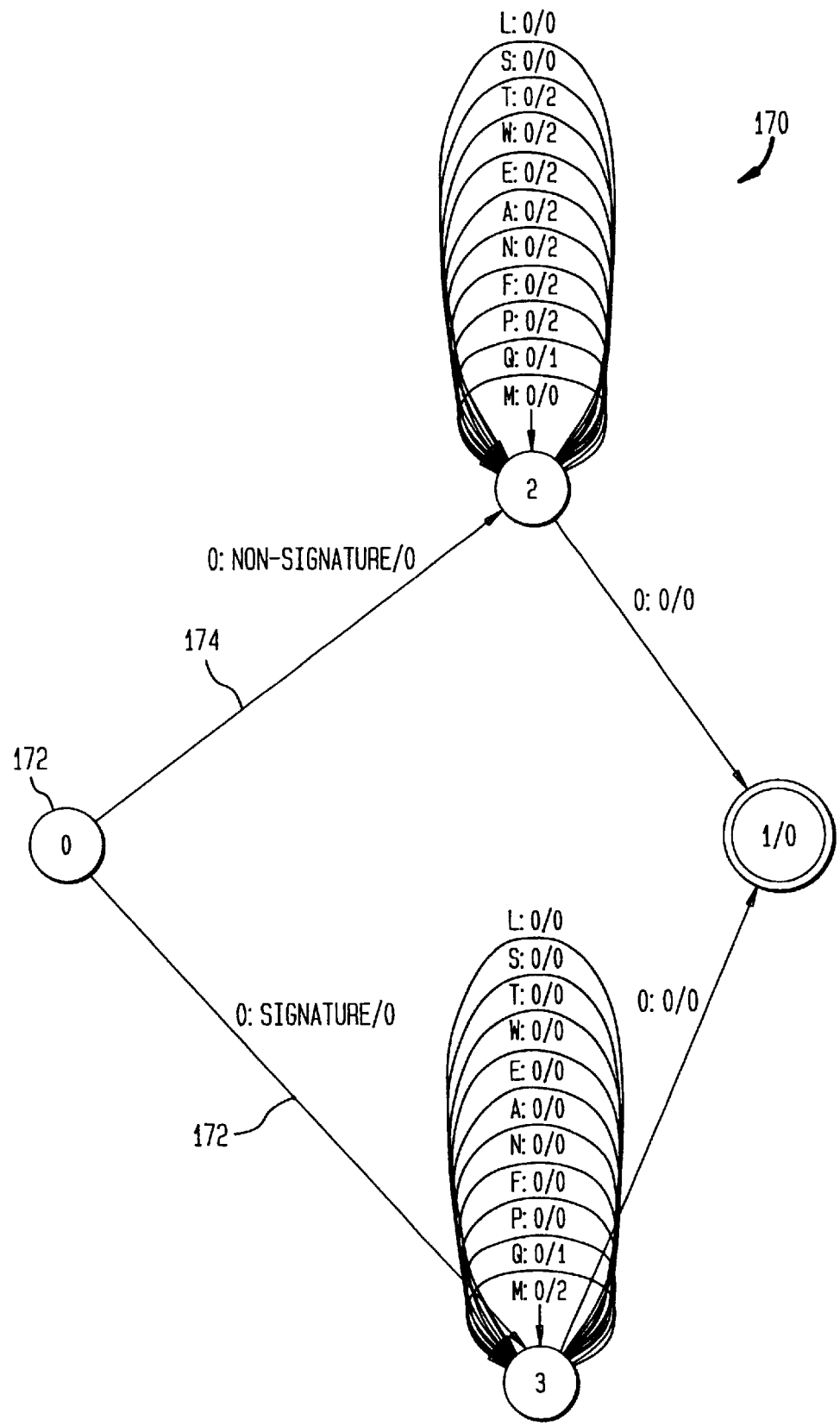
FIG. 13 illustrates an exemplary WFST for signature block identification.

This observation is reflected in the WFST 170 illustrated in FIG. 13. Starting from the source node 172, there is one path 172 leading to the signature block and another path 174 leading to non-signature block. In the path 172 to the signature block, miscellaneous text is penalized by being assigned a high cost while all other functional classes are encouraged by being assigned low costs. This is opposite in the path 174 to non-signature block where miscellaneous text is encouraged and all other classes are discouraged.

Figure 14:
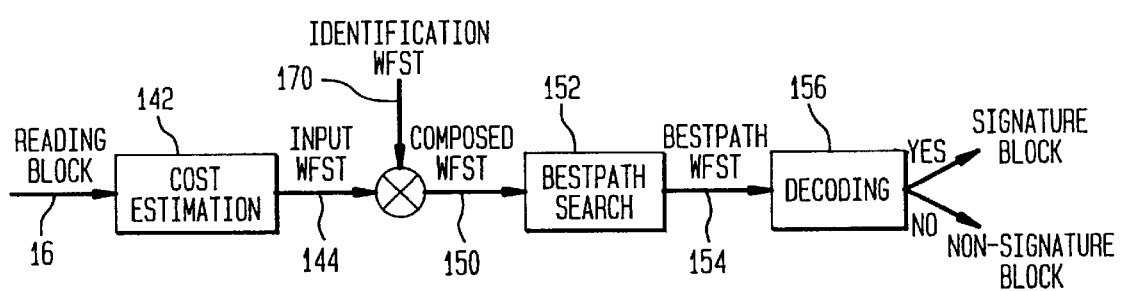
FIG. 14 illustrates an exemplary technique for performing signature block identification.

The geometrical analysis 12 and language analysis 14 are performed on each unknown text region. As shown in FIG. 14, which is a specific implementation of the processing illustrated in FIG. 5, an input WFST 144 is constructed and composed with the identification WFST 170 in FIG. 13. The optimal path in the composed WFST 150 indicates whether the unknown text region is a signature block.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of analyzing a loosely constrained text block, comprising the steps of:
    performing a two-dimensional geometrical analysis to divide the loosely constrained text block into reading blocks;
    performing a one-dimensional language analysis on the reading blocks to divide the reading blocks into functional blocks; and
    classifying each of functional blocks as belonging to a functional class.

2. The method of claim 1, wherein said method is a preprocess performed in e-mail text-to-speech rendering.

3. The method of claim 1, wherein the loosely constrained text block is an e-mail message signature block.

4. The method of claim 1, wherein the two-dimensional geometric analysis includes the steps of line segment extraction and connected component analysis on foreground characters in the loosely constrained text block to produce the reading blocks.

5. The method of claim 1, wherein the one-dimensional language analysis includes the steps of cost estimating to produce an input weighted finite state transducer, composing the input weighted finite state transducers with lexical and grammatical weighted finite state transducers, performing a bestpath search to identify a bestpath weighted finite state transducer and decoding the bestpath weighted finite state transducer into the functional blocks.

6. The method of claim 4, wherein the two-dimensional geometric analysis further includes the steps of line segment extraction and connected component analysis on background characters in the loosely constrained text block to ensure the reading blocks include no mixed reading blocks.

7. The method of claim 5, wherein the cost estimating step includes expression matching for strict classes and implementing commonly observed conventions for loose classes.

8. A method of automatically identifying a personal name from a user name in a loosely constrained text block, comprising the steps of:
    constructing a single path finite state acceptor which generates the user name;
    constructing a well-formed user name finite state acceptor for a candidate phrase in the loosely constrained text block;
    composing the single path finite state acceptor with the well-formed user name finite state acceptor to produce a resulting finite state acceptor; and
    identifying the candidate phrase as the personal name if the resulting finite state acceptor is non-empty.

9. The method of claim 8, wherein said method is part of a preprocess performed in e-mail text-to-speech rendering.

10. The method of claim 8, wherein the loosely constrained text block is an e-mail message signature block and the user name is a name portion of an e-mail address.

11. A processor for analyzing a loosely constrained text block, comprising:
    a two-dimensional geometrical analysis processing unit for dividing the loosely constrained text block into reading blocks;
    a one-dimensional language analysis processing unit for dividing the reading blocks into functional blocks; and
    a classifying processor unit for classifying each of functional blocks as belonging to a functional class.

12. The processor of claim 11, wherein said processor is a preprocessor used in e-mail text-to-speech rendering.

13. The processor of claim 11, wherein the loosely constrained text block is an e-mail message signature block.

14. The processor of claim 11, wherein the two-dimensional geometric analysis processor unit includes a line segment extraction processing unit and a connected component analysis processing unit for performing line segment extraction and a connected component analysis on foreground characters in the loosely constrained text block to produce the reading blocks.

15. The processor of claim 11, wherein the one-dimensional language analysis processing unit includes a cost estimating processing unit for producing an input weighted finite state transducer, a composing processor unit for composing the input weighted finite state transducers with lexical and grammatical weighted finite state transducers, a bestpath search processing unit for identifying a bestpath weighted finite state transducer and a decoding processing unit for decoding the bestpath weighted finite state transducer into the functional blocks.

16. The processor of claim 14, wherein the two-dimensional geometric analysis processing unit further includes a line segment extraction processing unit and a connected component analysis processing unit for performing line segment extraction and connected component analysis on background characters in the loosely constrained text block to ensure the reading blocks include no mixed reading blocks.

17. The processor of claim 15, wherein the cost estimating processing unit performs expression matching for strict classes and implements commonly observed conventions for loose classes.

18. A process or for automatically identifying a personal name from a user name in a loosely constrained text block, comprising:
    a first processing unit for constructing a single path finite state acceptor which generates the user name;
    a second processing unit for constructing a well-formed user name finite state acceptor for a candidate phrase in the loosely constrained text block;
    a third processing unit for composing the single path finite state acceptor with the well-formed user name finite state acceptor to produce a resulting finite state acceptor; and
    a fourth processing unit for identifying the candidate phrase as the personal name if the resulting finite state acceptor is non-empty.

19. The processor of claim 18, wherein said processor is a preprocessor performed in e-mail text-to-speech rendering.

20. The processor of claim 18, wherein the loosely constrained text block is an e-mail message signature block and the user name is a name portion of an e-mail address.

21. A computer program embodied on a computer-readable medium for analyzing a loosely constrained text block, comprising:
    a two-dimensional geometrical analysis source code segment for dividing the loosely constrained text block into reading blocks;
    a one-dimensional language analysis source code segment for dividing the reading blocks into functional blocks; and
    a classifying source code segment for classifying if each of functional blocks as belonging to a functional class.

22. The computer program of claim 21, wherein said computer program is a preprocess performed in e-mail text-to-speech rendering.

23. The computer program of claim 21, wherein the loosely constrained text block is an e-mail message signature block.

24. The computer program of claim 21, wherein the two-dimensional geometric analysis source code segment includes a line segment extraction source code segment and a connected component analysis source code segment for performing line segment extraction and connected component analysis on foreground characters in the loosely constrained text block to produce the reading blocks.

25. The computer program of claim 21, wherein the one-dimensional language analysis source code segment includes a cost estimating source code segment for producing an input weighted finite state transducer, a composing source code segment for composing the input weighted finite state transducers with lexical and grammatical weighted finite state transducers, a bestpath search source code segment for identifying a bestpath weighted finite state transducer and a decoding source code segment for decoding the bestpath weighted finite state transducer into the functional blocks.

26. The computer program of claim 24, wherein the two-dimensional geometric analysis source code segment further includes a line segment extraction source code segment and a connected component analysis source code segment for performing line segment extraction and connected component analysis on background characters in the loosely constrained text block to ensure the reading blocks include no mixed reading blocks.

27. The computer program of claim 25, wherein the cost estimating source code segment performing expression matching for strict classes and implements commonly observed conventions for loose classes.

28. A computer program embodied in a computer readable medium for automatically identifying a personal name from a user name in a loosely constrained text block, comprising:
    a first source code segment for constructing a single path finite state acceptor which generates the user name;
    a second source code segment for constructing a well-formed user name finite state acceptor for a candidate phrase in the loosely constrained text block;
    a third source code segment for composing the single path finite state acceptor with the well-formed user name finite state acceptor to produce a resulting finite state acceptor; and
    a fourth source code segment for identifying the candidate phrase as the personal name if the resulting finite state acceptor is non-empty.

29. The computer program of claim 28, wherein said computer program is part of a preprocess performed in e-mail text-to-speech rendering.

30. The computer program of claim 28, wherein the loosely constrained text block is an e-mail message signature block and the user name is a name portion of an e-mail address.

31. A computer data signal for analyzing a loosely constrained text block, comprising:
    a two-dimensional geometrical analysis signal segment for dividing the loosely constrained text block into reading blocks;
    a one-dimensional language analysis signal segment for dividing the reading blocks into functional blocks; and
    a classifying signal segment for classifying each of functional blocks as belonging to a functional class.

32. The computer data signal of claim 31, wherein said computer data signal executes a preprocess performed in e-mail text-to-speech rendering.

33. The computer data signal of claim 31, wherein the loosely constrained text block is an e-mail message signature block.

34. The computer data signal of claim 31, wherein the two-dimensional geometric analysis signal segment includes a line segment extraction signal segment and a connected component analysis signal segment for performing line segment extraction and connected component analysis on foreground characters in the loosely constrained text block to produce the reading blocks.

35. The computer data signal of claim 31, wherein the one-dimensional language analysis signal segment includes a cost estimating signal segment for producing an input weighted finite state transducer, a composing signal segment for composing the input weighted finite state transducers with lexical and grammatical weighted finite state transducers, a bestpath search signal segment for identifying a bestpath weighted finite state transducer and a decoding signal segment for decoding the bestpath weighted finite state transducer into the functional blocks.

36. The computer data signal of claim 34, wherein the two-dimensional geometric analysis signal segment further includes a line segment extraction signal segment and a connected component analysis signal segment for performing line segment extraction and connected component analysis on background characters in the loosely constrained text block to ensure the reading blocks include no mixed reading blocks.

37. The computer data signal of claim 35, wherein the cost estimating signal segment performs expression matching for strict classes and implements commonly observed conventions for loose classes.

38. A computer data signal for automatically identifying a personal name from a user name in a loosely constrained text block, comprising:
- a first signal segment for constructing a single path finite state acceptor which generates the user name;
- a second signal segment for constructing a well-formed user name finite state acceptor for a candidate phrase in the loosely constrained text block;
- a third signal segment for composing the single path finite state acceptor with the well-formed user name finite state acceptor to produce a resulting finite state acceptor; and
- a fourth signal segment for identifying the candidate phrase as the personal name if the resulting finite state acceptor is non-empty.

39. The computer data signal of claim 38, wherein said computer data signal executes a preprocess performed in e-mail text-to-speech rendering.

40. The computer data signal of claim 38, wherein the loosely constrained text block is an e-mail message signature block and the user name is a name portion of an e-mail address.

41. The computer data signal of claim 31, wherein said computer data signal is embodied in a carrier wave.

42. The computer data signal of claim 38, wherein said computer data signal is embodied in a carrier wave.

* * * * *